United States Patent [19]

Sundberg

[11] 4,058,048
[45] Nov. 15, 1977

[54] CLINCHNAIL
[75] Inventor: Börje Erling Ingvar Sundberg, Tyreso, Sweden
[73] Assignee: Nordisk Kartro Aktiebolag, Sweden
[21] Appl. No.: 618,369
[22] Filed: Oct. 1, 1975
[30] Foreign Application Priority Data
  Oct. 2, 1974  Sweden .............................. 74123787
  Aug. 27, 1975  Sweden .............................. 75095372
[51] Int. Cl.² .............................................. E01B 9/12
[52] U.S. Cl. ........................................... 85/31; 85/26
[58] Field of Search ............................... 85/30, 31, 26
[56] References Cited
U.S. PATENT DOCUMENTS

| 387,380 | 8/1888 | Thayer | 85/30 |
|---|---|---|---|
| 1,352,573 | 9/1920 | Balfour et al. | 85/31 |
| 2,128,798 | 8/1938 | Burr | 85/31 |
| 3,190,170 | 6/1965 | Baum et al. | 85/31 X |
| 3,800,654 | 4/1974 | Larson | 85/30X |

FOREIGN PATENT DOCUMENTS

| 1,212,248 | 3/1960 | France | 85/31 |
|---|---|---|---|
| 618,911 | 3/1949 | United Kingdom | 85/31 |

Primary Examiner—Roy D. Frazier
Assistant Examiner—Rodney H. Bonck
Attorney, Agent, or Firm—Hill, Gross, Simpson, Van Santen, Steadman, Chiara & Simpson

[57] ABSTRACT

A clinchnail having an elongated shank with a head at one end and a tip portion at the other end thereof, wherein the shank is of essentially constant cross-sectional configuration throughout its length and the tip portion has a cross-sectional configuration differing from that of the shank, said tip portion being laterally offset from said shank with respect to the longitudinal axis of the shank.

3 Claims, 19 Drawing Figures

CLINCHNAIL

BACKGROUND OF THE INVENTION

1. Field of the Invention

This invention relates to nail construction of the self-clinching type.

2. Prior Art

In many kinds of nailing work, clinching is done, namely that the nail is passed through the wood, after which its tip is bent sidewardly, usually in the direction of the wood grain, and preferably is pressed a little into the wood surface.

In some cases the wood is placed against a suitable support, such as for instance a grooved metal plate, so that the clinching can follow automatically when the nail is driven in from one side of the wood. When the nails are applied by means of so called nail guns or the like, such supports are much affected by the clinching, and the supports become heavily worn, so that they must be repaired or replaced comparatively often.

A proposed remedy to the just mentioned problem a nail whose shank has, at some distance from the point, a weakening so that the nail tip can be bent sidewardly easier, namely by a bending at the place of the weakening. This weakening lies at a distance from the underside of the nail head corresponding to the total wood thickness.

A disadvantage with these known clinchnails is that many different nail dimensions have to be available to fit a variety of different total wood thickness. Another disadvantage is that the clinching may become unsatisfactory as a consequence of rather small variations in the penetration depth of the nails or nail heads. When using the known clinchable nails with a weakening there is a possibility, that the part of the nail shank which is bent sidewardly may loosen due to a rupture at the weakening, whereby the desired effect of the clinching is lost, so that the nail connection is weakened.

SUMMARY OF THE INVENTION

According to the invention there is provided a clinchnail having an elongated shank with a head at one end and a tip portion at the other end thereof, wherein the shank is of essentially constant cross-sectional configuration throughout its length and the tip portion has a cross-sectional configuration differing from that of the shank, said tip portion being laterally offset from said shank with respect to the longitudinal axis of the shank.

ON THE DRAWINGS

Figure 12:
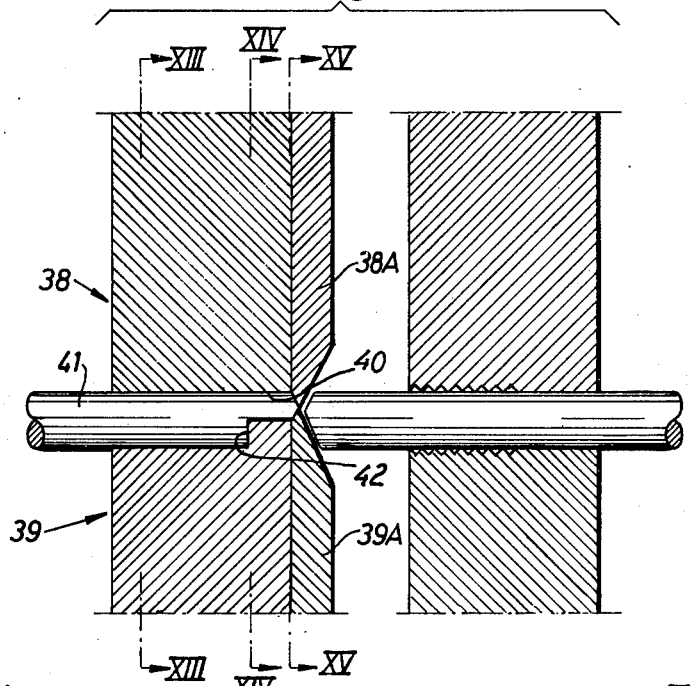
FIG. 12 shows schematically one step of the manufacture of a nail according to FIGS. 8 and 9.
Figure 13:
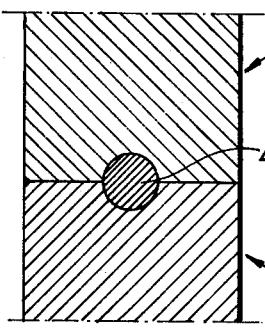
Figure 14:
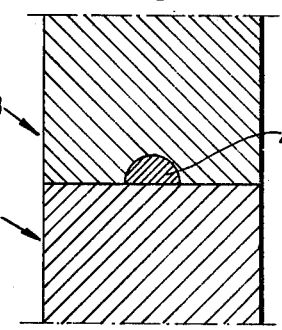
Figure 15:
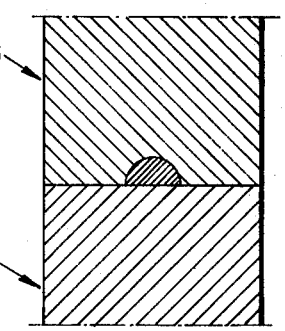
Figure 16:
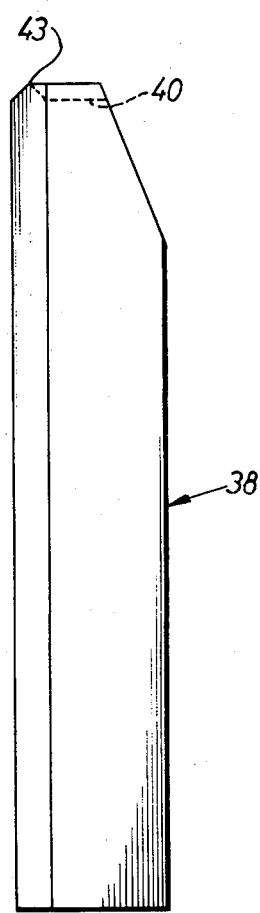
Figure 17:
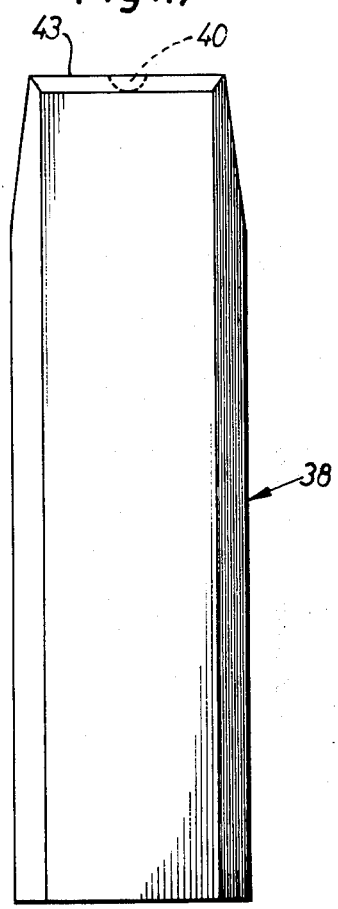
Figure 18:
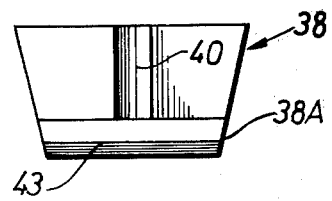
Figure 19:
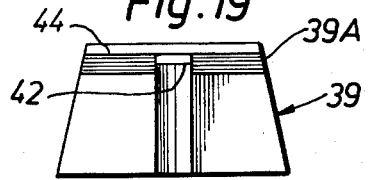

FIGS. 13, 14 and 15 respectively show sections along the planes XIII-XIII, XIV—XIV and XV—XV of FIG. 12;

FIGS. 16, 17 and 18 show a tool portion in side-view, plane-view and end-view respectively; and FIG. 19 shows a tool portion cooperating with the tool portion in FIGS. 16-18.

BRIEF DESCRIPTION OF PREFERRED EMBODIMENTS

Figure 1:
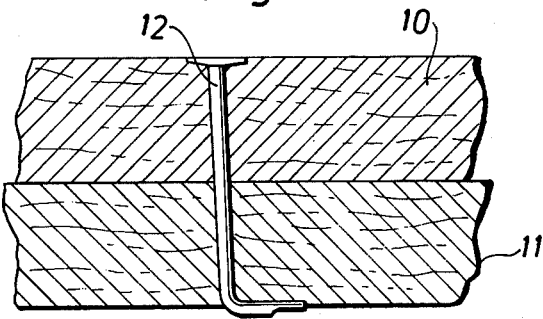
FIG. 1 shows a section two wood pieces which have been nailed to each other by means of a clinchnail according to the invention.

FIG. 1 shows schematically the nailing together of two wood pieces 10, 11 by means of a clinchnail 12 according to the invention. The nail tip, generally denoted 12A, after having passed through the two wood pieces 10, 11, has been clinched against the underside of the wood piece 11 and in particular preferably so that the nail tip 12A is turned in the direction of the wood grain and is somewhat squeezed into the underside of the wood piece 11. The nail does not extend perpendicularly through the wood pieces 10, 11, but runs somewhat obliquely therethrough. This small oblique position of the nailshank is not the result of a corresponding oblique positioning of the driving tool, but the result of the fact that the nail itself, when being driven, has taken this direction.

Furthermore, the nail tip 12A clinched against the wood piece 11 forms a part of the nailshank, and therefore at least the major part of the clinched tip portion has the same cross-sectional shape as the nailshank.

The clinching illustrated in FIG. 1 has been achieved by passing the nail 12 through the wood pieces 10 and 11 which are then resting on a hard support by which the clinching of the nail tip 12A is automatically accomplished.

Figure 2:
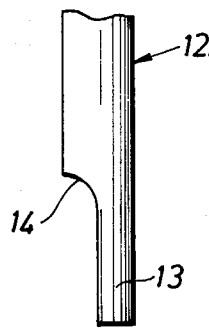
FIGS. 2-5 show to a larger scale some different embodiments of the nail type according to the invention.

In FIG. 2 the nail tip 12A has a cross-sectionally reduced portion 13 of essentially constant cross-sectional shape. The relation between the cross-section of the portion 13 and that of the nailshank can amount to 0.2:1 to 0.8:1, preferably about 0.25 to 0.5:1. The transition 14 between the portion 13 and the nailshank has a rather small radius of curvature. The outermost end of the portion 13 is essentially bluntly cut.

Figure 3:
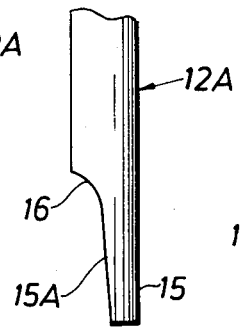

In the embodiment according to FIG. 3 the reduced portion 15 does not have a fully constant cross-section, but the cross-section is reduced somewhat in the direction from the nailshank 12 towards the nail point, i.e. so that the left surface 15A of the portion 15 in the drawing is inclined somewhat with respect to the central axis of the nail. The surface 15A merges with the outside of the nailshank over a radius 16, which is slightly greater than that of the transition 14 in the embodiment according to FIG. 2. Also in this embodiment the outer end is bluntly cut.

Figure 4:
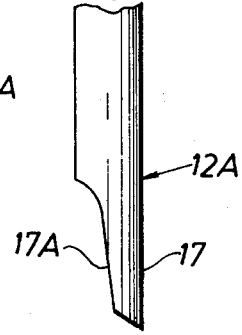

The embodiment shown in FIG. 4 differs from the above described ones essentially in that the left surface 17A of the reduced portion 17 on the drawing is inclined with a still larger angle with respect to the central axis of the nailshank, than that of FIG. 3, and, furthermore, the outermost end of the reduced portion 17 in FIG. 4 is not bluntly cut off, but is slightly inclined with respect to a plane perpendicular to the central axis of the nail.

Figure 5:
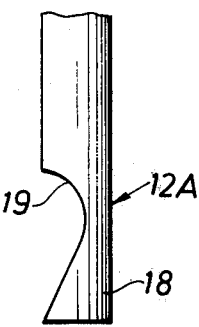

In FIG. 5 the reduced end portion 18 is formed by an arcuate recess 19, which extends almost all the way to the nail tip. When a nail is shown in FIG. 5 hits the hard support, on which the wood pieces 10, 11 are resting, the clinching will go in a direction opposite to that which takes place with the embodiments according to FIGS. 2, 3 and 4.

With nails according to the invention the clinching does not take place by bending the nail end sidewardly at a weakened point, but is instead initiated at the reduced outer end portions, and is then completed by bending of the nailshank progressing continuously lengthwise thereof, whereby consequently the strongest bending of the clinched nail is within an area of the nailshank, which has a full shank cross-section.

Figure 8:
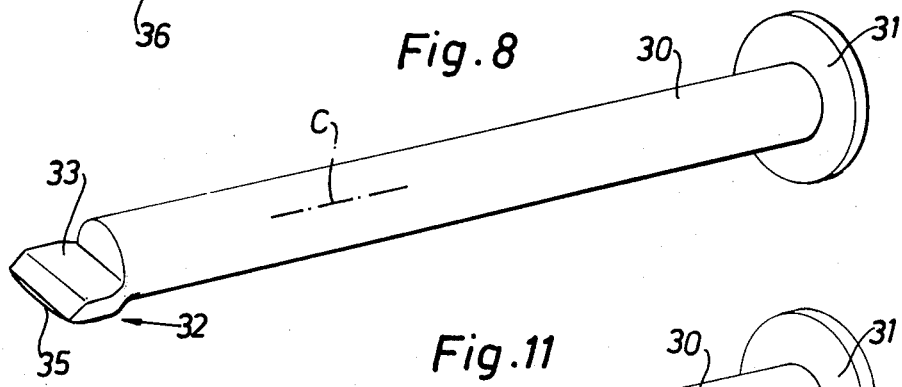
FIGS. 8 and 9 show in perspective a fifth embodiment of the clinchnail according to the invention seen in two different directions.
Figure 9:
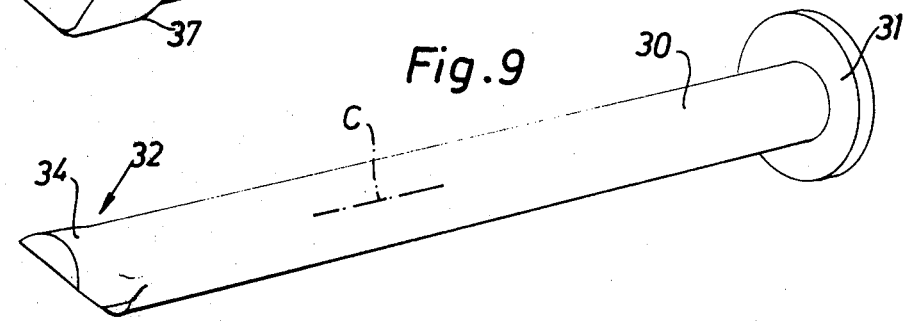

The nail in FIGS. 8 and 9 has an ordinary shank 30 and a flat, essentially circular head 31. The shank 30 may be of round cross-section but it can also be of more or less rectangular cross-section, and it may be provided with ribs to improve the holding strength. At the tip the nail in FIGS. 8 and 9 is constructed to be selfclinching, i.e. on hitting a hard support the nail tip initiates a bending, which progresses along the nailshank. In this embodiment the selfclinching capacity has not been achieved due to a cross-sectional reduced portion but on the contrary by means of a portion, which may be described as side-deformed and flattened out. The essential feature is that the side-deformation or flattening out has been achieved without any material removal.

More particularly, the nail in FIGS. 8 and 9 has a tip portion generally denoted 32 which is deformed sidewardly in relation to the central axis C and is simultaneously somewhat flattened. The tip portion is defined by a rather flat inner side 33, a part-cylindrical outside 34 and an end surface 35. The end surface may be flat and perpendicular to the central axis C but it may also have a single bevel of, for instance, 45° to the inner side 33 or may it be bevelled towards both the inner side 33 and the outside 34 whereby consequently the nail point is chisel-shaped.

Figure 10:
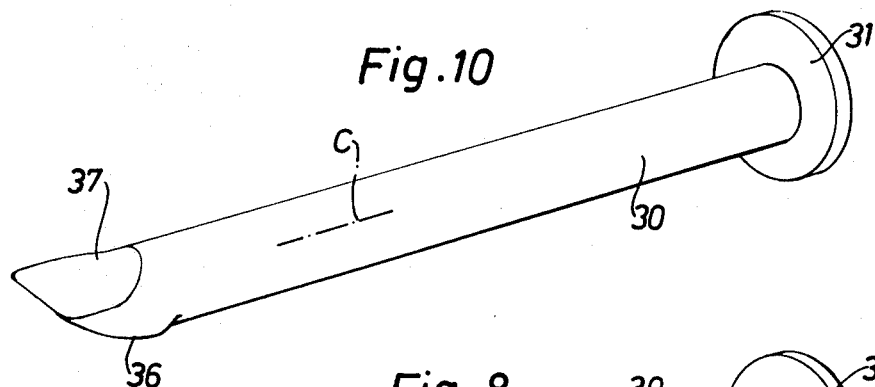
FIGS. 10 and 11 show in perspective a sixth embodiment of the clinchnail according to the invention, also seen from different directions.
Figure 11:
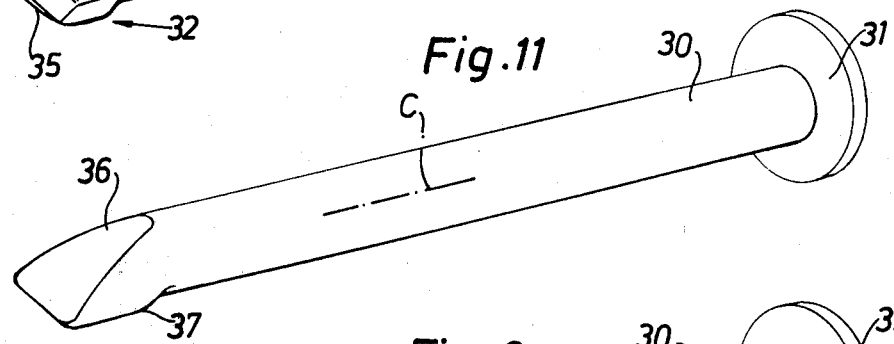

In the embodiment according to FIGS. 10 and 11 the nail tip is also deformed and somewhat flattened, whereby the tip, however, is slight spoon-shaped. The nail tip has one surface 36 resembling the under surface of a spoon bowl, and a second flattened surface 37, slightly off-set inwardly from the nailshank surface. The surface 36 which is inclined with respect to the central axis C meets with the surface 37 in a slightly curved edge line as contrasted to the straight line edge line in the embodiment according to FIGS. 8 and 9.

For the manufacture of the nail according to the invention in the manner as indicated in FIGS. 12-15 an ordinary nail machine is used, however, with the tip cutting tools replaced by tool portions according to FIGS. 16-19. A first one of these portions generally denoted 38, is arranged to cooperate with a second mirror symmetrical tool portion 39, FIG. 19; the portions 38 and 39 are synchronously movable towards and away from each other with respect to a plane containing the central axis C of the nails. Each of the tool portions 38, 39 comprises an essentially parallelepipedic body, which in the end thereof is provided with a groove 40 of a cross-sectional configuration essentially corresponding to the half of the cross-sectional shape of the nail thread blank 41. The tool portion 39 has its groove provided with a rise 42 to bring about the deformation and flattening of the nail tip as the tool portions 38, 39 are closed. The groove 46 of the tool portion 38 is designed so as to receive the material flowing from the nail thread blank at the deformation and flattening. Further, each one of the tool portions 38, 39 has a cutting steel 38A, 39A, respectively, which cut off the nail from the nail thread blank as the tool portions are closed. In the embodiment according to FIGS. 16-19 both the cutting steels are bevelled, so that edge lines 42, 43 are formed, whereby the final chisel-shaped nail point has its edge bevelled in both directions as is shown in FIGS. 8 and 9. If, on the contrary, only one of the cutting steels had such a bevel, the final chisel-shaped nail point would be bevelled towards one side only.

The manufacture of nails according to FIGS. 10 and 11 follows in an analogous way. However the grooves of the tool portions are so designed that the final nail point takes the shape as shown in FIGS. 10 and 11.

The forming of the nail point in each takes place without removal of any material from the nail blank but instead by a deformation of the material by so-called cold-heading.

Figure 6:
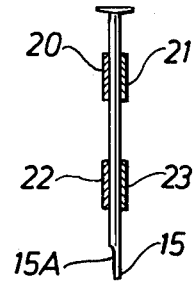
FIG. 6 shows a cross-section through a nail package having one embodiment of the nail according to the invention.
Figure 7:
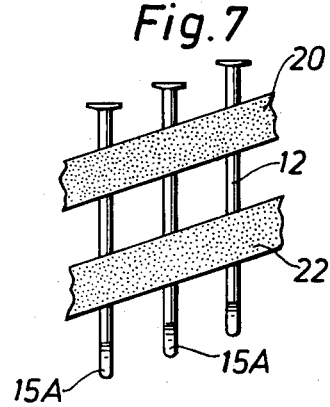
FIG. 7 is a corresponding side-view of a part of a nail package according to FIG. 6.

As already mentioned above the clinching preferably is carried out so that the nail end is bent sidewardly in the direction of the wood again. Therefore, the nails according to this invention, are advantageously used in the form of so-called nail packages, i.e. the nails are arranged parallel to each other in a row on a suitable carrier. An example of such a nail package is illustrated in FIGS. 6 and 7, where the separate nails 12 are disposed in a row parallel to each other between strips 20, 21 and 22, 23, which hold the nails at a desired spacing, with a suitable filling between the nailshanks, if desired. On collating such nail packages there are no problems in orientating the nails in one and the same position. Then, when a nail package of this type is used with a nail gun it is easy to ensure that clinching follows by bending the nail tips in the direction of the wood grain, namely by turning the nail gun to the desired orientation in regard to the wood and thereafter maintaining that turned position from one nail to the other.

I claim:
1. A clinch nail comprising:
   a. a single elongated shank having a smooth surface throughout its length and a constant cross-sectional configuration throughout said length;
   b. a head at one end of said shank;
   c. a tip portion at the other end of said shank, said tip portion including two converging surfaces merging to form a substantially straight leading line-like edge extending perpendicularly to, but laterally offset from, the center line of the shank, said line-like edge having a length exceeding the cross-section thickness of said shank, and said tip portion having a length between said constant configuration and said edge which is less than one and one-half times the cross-sectional thickness of said shank.

2. A clinchnail according to claim 1, said converging surfaces being flat.

3. A clinch nail according to claim 1, one of said converging surfaces being flat, and the other of said converging surfaces being cylindrically convex about an axis parallel to said edge.

* * * * *